US006577320B1

(12) United States Patent
Kirk

(10) Patent No.: US 6,577,320 B1
(45) Date of Patent: Jun. 10, 2003

(54) METHOD AND APPARATUS FOR PROCESSING MULTIPLE TYPES OF PIXEL COMPONENT REPRESENTATIONS INCLUDING PROCESSES OF PREMULTIPLICATION, POSTMULTIPLICATION, AND COLORKEYING/CHROMAKEYING

(75) Inventor: David B. Kirk, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/273,995

(22) Filed: Mar. 22, 1999

(51) Int. Cl.[7] .......................... G09G 5/00; G06T 15/00

(52) U.S. Cl. ...................................... 345/582; 586/522

(58) Field of Search ................................ 345/582, 522, 345/586

(56) References Cited

U.S. PATENT DOCUMENTS

| | | | | |
|---|---|---|---|---|
| 5,838,329 A | | 11/1998 | Day | |
| 5,844,567 A | | 12/1998 | Gossett et al. | |
| 5,852,451 A | | 12/1998 | Cox et al. | |
| 5,870,509 A | | 2/1999 | Alcorn | |
| 5,990,903 A | * | 11/1999 | Donovan | 345/589 |
| 6,005,582 A | * | 12/1999 | Gabriel et al. | 345/586 |
| 6,166,748 A | * | 12/2000 | Van Hook et al. | 345/522 |
| 6,208,350 B1 | * | 3/2001 | Herrera | 345/586 |

OTHER PUBLICATIONS

Lance Williams; *Pyramidal Parametrics*; Computer Graphics, vol. 17, No. 3, Jul. 1983.

* cited by examiner

*Primary Examiner*—Matthew C. Bella
*Assistant Examiner*—Anthony Blackman
(74) *Attorney, Agent, or Firm*—Silicon Valley IP Group; Kevin J. Zilka

(57) ABSTRACT

A method is provided for processing multiple types of pixel component representations. The method first includes identifying a plurality of texels in a texture pattern grid that correspond to a pixel. Thereafter, information components of the pixel, i.e. R, G, B, and α are multiplied if the information components of the pixel are in a postmultiplied representation. Further, a colorkeyed replacement operation is carried out if the information components of the pixel are in a colorkeyed representation and at least one of the texels substantially matches a colorkey. Next, a position is interpolated on the texture pattern grid between the texels that corresponds to the pixel. Finally, the information components of the pixel are filtered.

31 Claims, 7 Drawing Sheets

METHOD AND APPARATUS FOR PROCESSING MULTIPLE TYPES OF PIXEL COMPONENT REPRESENTATIONS INCLUDING PROCESSES OF PREMULTIPLICATION, POSTMULTIPLICATION, AND COLORKEYING/CHROMAKEYING

FIELD OF THE INVENTION

The present invention relates generally to computer graphics and, more particularly, to a method and apparatus for improved texture mapping for three-dimensional computer graphics.

BACKGROUND OF THE INVENTION

In the art of computers, two-dimensional and three-dimensional images are commonly depicted on a display, i.e. computer monitor, with a system including a central processing unit (CPU) that is connected to the display via a video card or the like. The display consists of a large number of pixels(picture elements) which each display a small portion of an image in response to video control signals received from the CPU. These video signals are conventionally manipulated by the video card in order to enhance images depicted on the display.

In particular, video signals received from a CPU typically include information in the form of a predetermined number of bits which are allocated to different components of the pixel with which it is associated. Such components include a Red (R), Green (G), Blue (B), and Alpha (α) component. While the R, G, and B components relate to the intensity of the corresponding color within the pixel, the α component may correspond to various types of information depending on the specific representation that is being employed.

In one representation, the α component corresponds to a "transparency" or "opacity" of the colors within the associated pixel. In such representation, the α component is commonly used for blending purposes. In yet another representation, the α component stores information relating to "coverage" for determining a fraction of how much color is present within the associated pixel. In all of the representations, the α component of the video signals contributes additional information for improving the resultant image.

It should be noted that the amount and allocation of binary information within the various R, G, B, and α components may vary depending on the particular application. In one example wherein 16 bits are provided for each pixel, the R, G, B, and α components may be allocated 5, 6, 5, and 0 bits, respectively, or, in another embodiment, 5, 5, 5, and 1 bits, respectively. In yet another example wherein each pixel has 32 allocated bits, each component (R, G, B, and α) may have 8 bits associated therewith.

With the number of bits allocated for each pixel, information stored therein may be used to generate the resultant image. FIG. 1 illustrates a pixel 10 corresponding to a small portion of an image 12 on a display 13. In order to provide a more realistic image, the R, G, and B components of the pixel are desired to accurately reflect a specific texture and lighting. As seen in FIG. 1A, this texture and lighting information is usually gathered from a texture pattern grid 14 stored in computer memory in a process conventionally referred to as texture mapping. During texture mapping, information associated with a pixel, or "texel" 16, from the texture pattern grid 14 stored in computer memory is selected and incorporated into the appropriate pixel 10 within the image 12. As will be set forth later, this texture mapping may be accomplished in various ways depending on the "representation" of the R, G, B, and α components of the video signals.

For example, "premultiplied", "postmultiplied", and "colorkeyed" are all different types of representations of the R, G, B, and α components of the video signals. The premultiplied representation refers to modulating the R, G, and B components with the α component in order to weight the R, G, and B components prior to further processing. In other words, the information associated with the α component is incorporated into the R, G, and B components before any further processing, i.e. filtering, etc. As will soon become apparent, such premultiplication of the components is critical for improving picture quality by way of interpolation.

A specific example of the foregoing texture mapping procedure is shown in FIG. 1B. As shown, the image to be mapped is referred to as a texture map 20, and its individual elements are referred to as texels. Texture map 20 is typically described in a rectangular coordinate scheme designated (u, v), and is ordinarily stored in some area of conventional memory, such as, for example, a conventional page-mode dynamic random-access memory (DRAM) or other paged memory. In the example of FIG. 1B, four pages 22, 24, 26, 28 are shown, each corresponding to a portion of the image area containing a corresponding portion of texture map 20.

Surface 30 in three-dimensional space has its own coordinate system (s,t,q). In a typical three-dimensional graphics system, surface 30 may be a primitive object such as a polygon; many such polygons may be defined in three-space to form a three-dimensional object or scene. Each such polygon would be placed in the coordinate system (s,t,q) similar to the surface 30 in FIG. 1B. Based on the orientation of surface 30 in three dimensions, and on the position and orientation of the "camera," surface 30 is in turn mapped onto a two-dimensional display grid 40 stored in a frame buffer for display by the computer.

The mapping of surface 30 onto display grid 40 is accomplished by matrix transforms that are well-known in the art. Display grid 40 has coordinate system (x, y) and is typically implemented in an area of memory reserved for video display, such as video random-access memory (video RAM) e.g. VRAM or synchronous graphics random-access memory (SGRAM).

Display grid 40 contains individual elements known as pixels, represented by distinct memory locations in video RAM. Each pixel in some region of display grid 40 maps onto a point on surface 30 and in turn to a point in texture map 20. Thus, in the example of FIG. 1B, point $A_{xy}$ of display grid 40 maps onto point $A_{stq}$ in the coordinates of surface 30 and to point $A_{uv}$ in texture map 20, or a group of points forming a region in texture map 20. Each of the mappings among display grid 40, surface 30, and texture map 20 may be point-to-point, point-to-region, region-to-point, or region-to-region.

In order to improve picture quality during texture mapping, it is often desired to interpolate between the various texels of the texture pattern grid in order to select the best texture and lighting information that is to be depicted within the pixel of the image. It is important to note that this interpolation, or bilinear interpolation, is permitted only when the various components of the video signals are weighted in the premultiplied representation. Without premultiplication, interpolation of the components of the video signals results in errors and artifacts.

A flowchart depicting the process associated with texture mapping in the premultiplied representation is shown in FIG. 2. During bilinear interpolation, four texels are first selected (see FIG. 3) and the interpolation is subsequently carried out between them for each of the R, G, and B components. With reference to the four selected texels A, B, C, and D of FIG. 3, the interpolation proceeds as follows for each of the R, G, and B components:

$$AB=A(1-x)+B(x)$$

$$CD=C(1-x)+D(x)$$

$$(R,G,B)=AB(1-y)+CD(y)$$

Interpolation between the texels affords a "smoother" more realistic resultant image on the display. It should be noted that interpolation need not be limited to merely two dimensions. Three-dimensional interpolation, or trilinear interpolation, may also be carried out. More information on trilinear interpolation may be found by looking to "Pyramidal Parametrics" by Williams, Lance. In Proceedings of SIGGRAPH '83 (July 1983), pp. 1–11 which is incorporated herein by reference in its entirety.

As mentioned earlier, interpolation during texture mapping is not effective when the various components of the video signals take on the postmultiplied and colorkeyed representations. Instead, in the case of postmultiplied representation, the R, G, and B components are first interpolated, then modulated, or multiplied, with the α component. This process is delineated FIG. 4A. In the case of the colorkeyed representation, texels that match the colorkey have their α component set to zero. This process is delineated in FIG. 4B.

In operation, video cards are often required to process each of the aforementioned types of pixel component representations. This mixture of the various pixel component representations in texture mapping brings rise to inconsistencies that in turn lead to difficulties in processing the video signals. In particular, such inconsistencies prompt the need for constraints which translate into additional processing that, in the end, result in reduced image quality.

There is thus a need for a processing technique that is capable of distinguishing between and handling multiple types of R, G, B, and α component representations.

DISCLOSURE OF THE INVENTION

A method and apparatus is provided for processing multiple types of pixel component representations. The method of the present invention first includes identifying a plurality of texels in a texture pattern grid that correspond to a pixel. Thereafter, there are two orthogonal states: colorkeyed or not, and premultiplied or not. These two states give four modes of operation. In the first mode, the texels are not colorkeyed but are premultiplied; in this mode, the color components are passed unmodified to the interpolator. In the second mode, the texels are not colorkeyed and not premultiplied; in this mode, the color components are multiplied by alpha before being passed to the interpolator. In the third mode, the texels are colorkeyed and are premultiplied; in this mode, for texels that match the colorkey, the color and alpha components are all set to zero, then passed to the interpolator. Texels that do not match the colorkey are unmodified. In the fourth mode, the texels are colorkeyed and not premultiplied; in this mode, for texels that match the colorkey, the color and alpha components are all set to zero. Following that, the color components are multiplied by alpha, then sent to the interpolator.

Next, a position is interpolated on the texture pattern grid between the texels that corresponds to the pixel. Finally, the information components of the pixel are filtered.

By this feature, the present invention ensures that the information components are in the premultiplied representation. As such, the benefits of interpolation may be accrued during texture mapping regardless of the type of component representation received.

These and other advantages of the present invention will become apparent upon reading the following detailed description and studying the various figures of the drawings.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

Figure 1A:
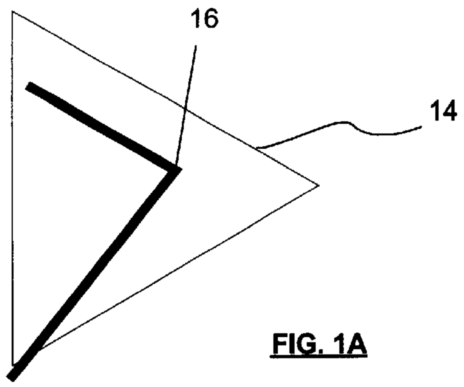
FIG. 1A PRIOR ART
FIG. 1A is an illustration of the texture pattern grid, again of the prior art.
Figure 1:
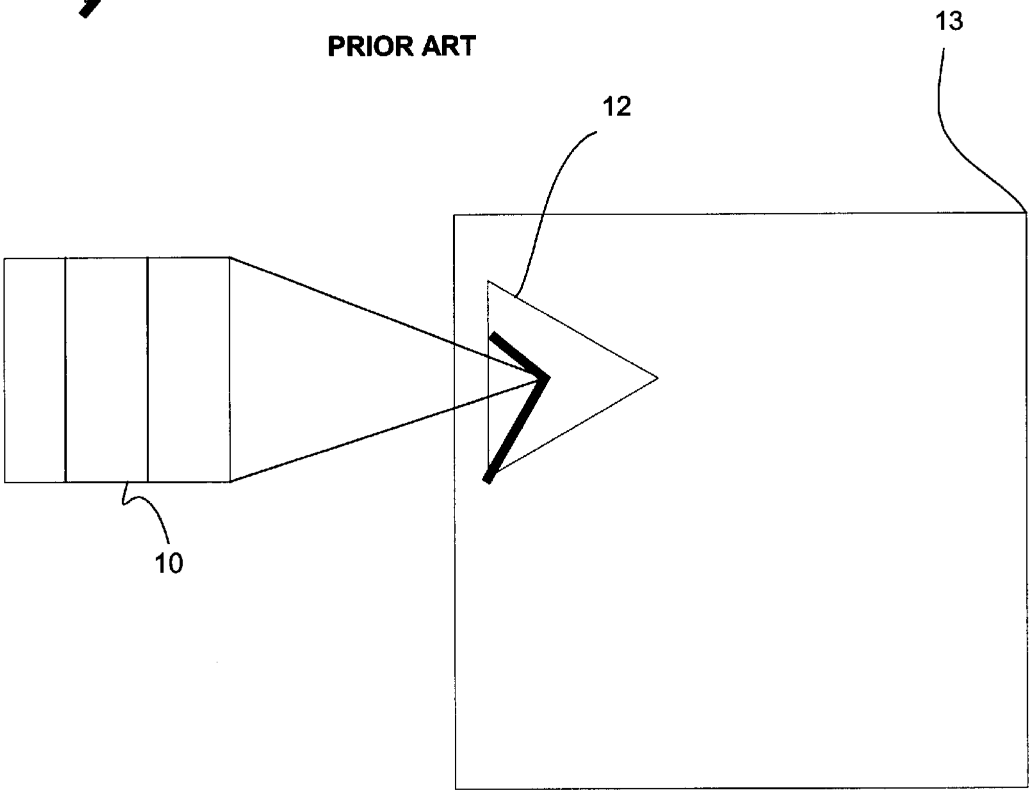
FIG. 1 PRIOR ART
FIG. 1 is an illustration of an image and a detailed view of a pixel of the image which corresponds to a particular texel of a texture pattern grid.
Figure 1B:
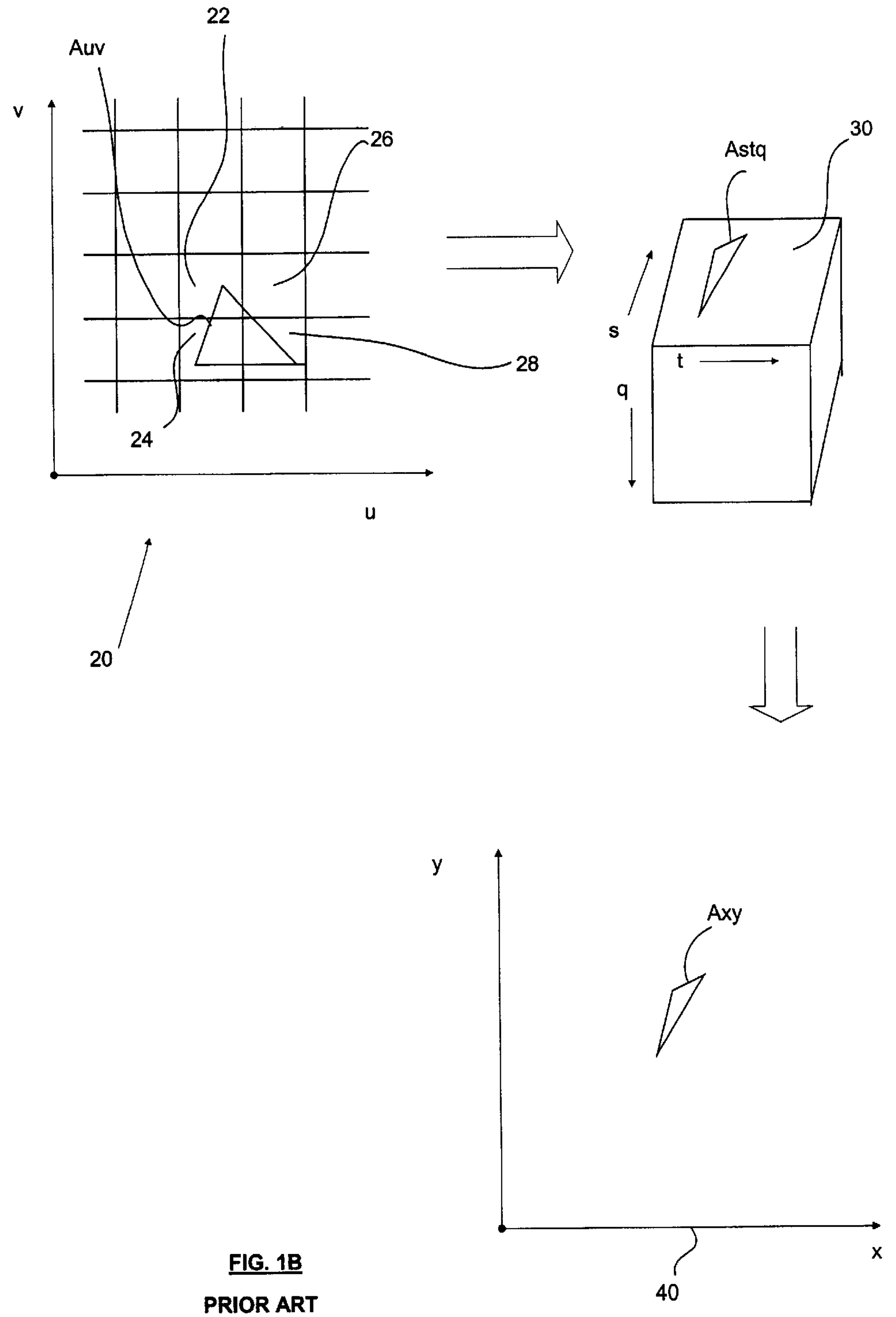
FIG. 1B PRIOR ART
FIG. 1B is a flow diagram depicting a prior art example of texture mapping.
Figure 2:
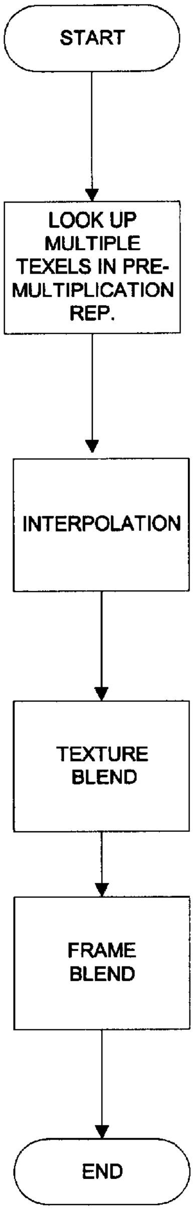
FIG. 2 PRIOR ART
FIG. 2 is a flow chart delineating a prior art computer graphics process executed with a premultiplied representation of the R, G, B, and α components.
Figure 4A:
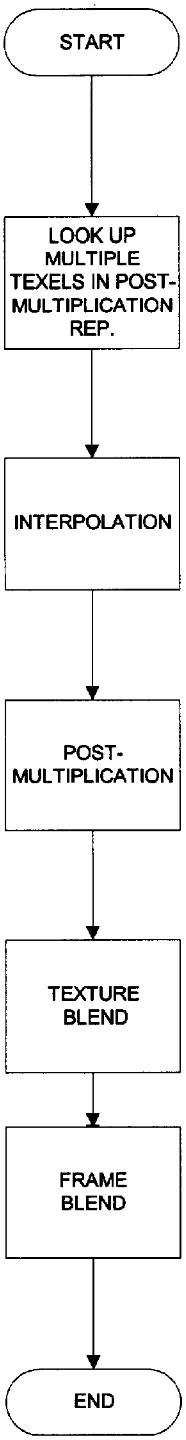
FIG. 4A PRIOR ART
FIG. 4A is a flow chart delineating a prior art computer graphics process executed with a postmultiplied representation of the R, G, B, and α components.
Figure 4B:
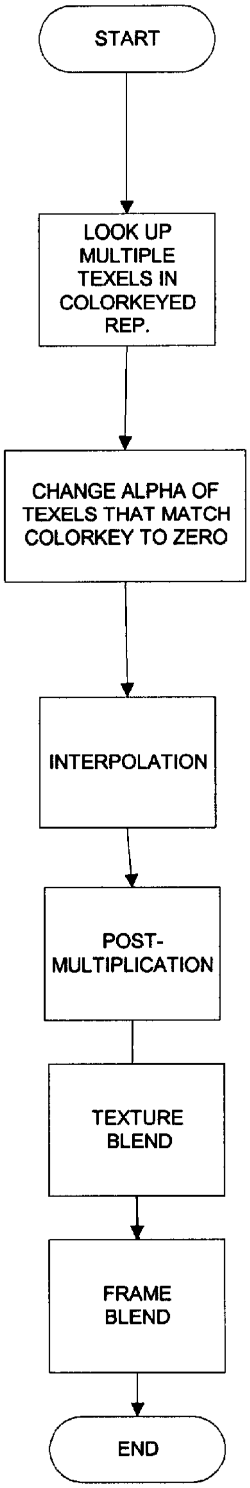
FIG. 4B PRIOR ART
FIG. 4B is a flow chart delineating a prior art computer graphics process executed with a colorkeyed representation of the R, G, B, and α components.
Figure 3:
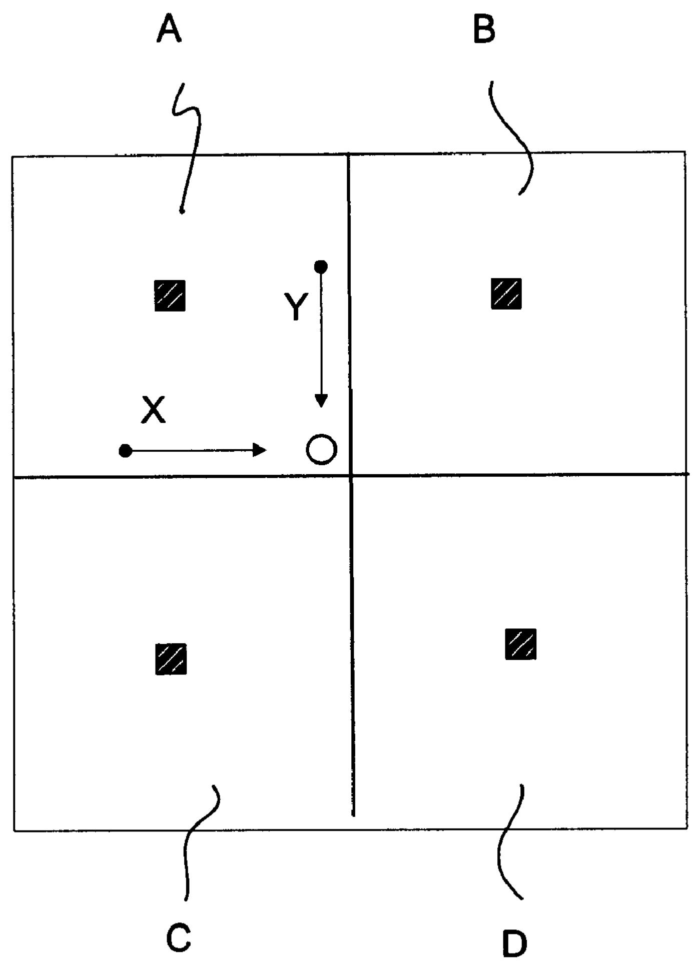
FIG. 3 PRIOR ART
FIG. 3 is a detailed prior art view of four texels.
Figure 5:
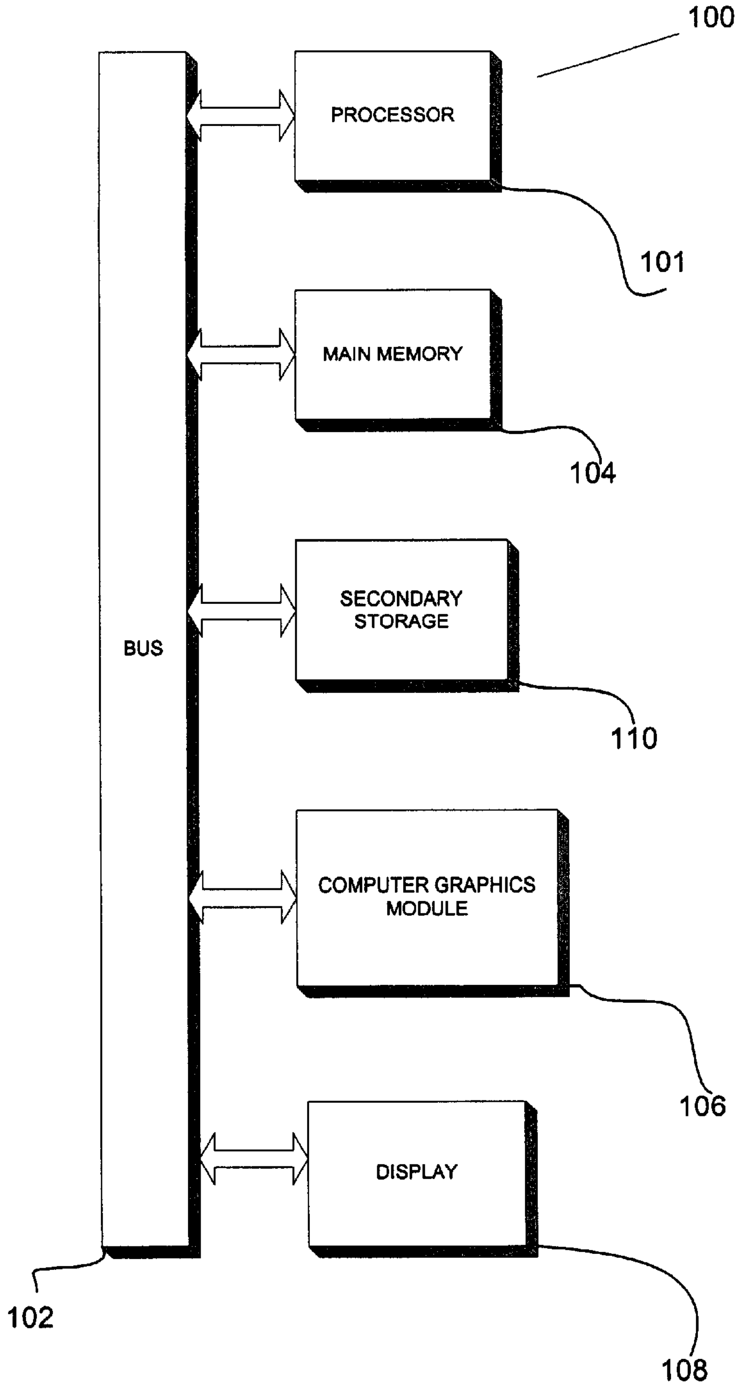
FIG. 5 is a block diagram of a digital processing system embodying the method and apparatus in accordance with a preferred embodiment.

FIGS. 1 to 4 illustrate prior art systems. With reference to FIG. 5, the present invention includes a computer graphics system that may be implemented using a computer 100. The computer 100 includes one or more processors, such as processor 101, which is connected to a communication bus 102. The computer 100 also includes a main memory 104. Control logic (software) and data are stored in the main memory 104 which may take the form of random access memory (RAM). The computer also includes a graphics module 106 and a display 108, i.e. a computer monitor.

The computer 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 104 and/or the secondary storage 110. Such computer programs, when executed, enable the computer 100 to perform various functions. Memory 104 and storage 110 are thus examples of computer-readable media.

The method associated with the present invention may be carried out by way of the computer 100 of FIG. 5. In one embodiment, the method is performed by the graphics module 106 which may take the form of hardware. Such hardware implementation may include a microcontroller or any other type of application specific integrated circuit (ASIC). In yet another embodiment, the method of the present invention may be carried out on the processor 101 by way of a computer program stored in the main memory 104 and/or the secondary storage 110 of the computer.

Figure 6:
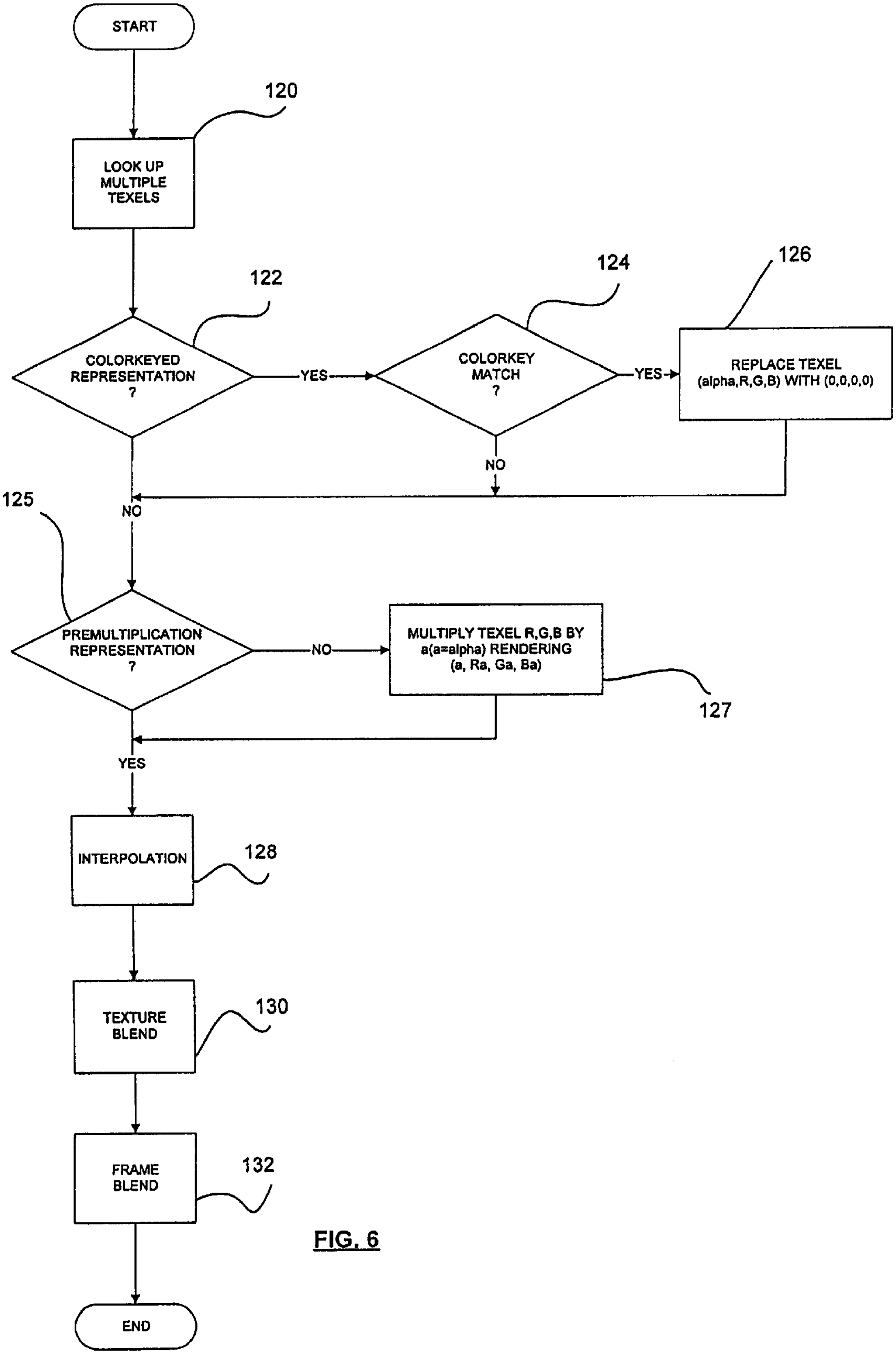
FIG. 6 is a flow chart delineating a method associated with the present invention that is capable of evaluating the particular type of representation of video signals and further properly processing the video signals per such evaluation in accordance with a preferred embodiment.

With reference now to FIG. 6, the present invention includes a method for processing pixel information components, i.e. R, G, B, and α, that have multiple types of pixel component representations. As mentioned earlier, various pixel component representations include premultiplied, postmultiplied, and colorkeyed representations. The premultiplied representation refers to modulating the R, G, and B components with the α component in order to weight the R, G, and B components prior to further processing. In other words, the information associated with the α component is incorporated into the R, G, and B components. It is important to note that this is done prior to any further processing, i.e. filtering, etc. Such premultiplication of the components is critical for allowing an enhancement of an image by way of interpolation.

At the start of the method of the present invention, a plurality of texels are identified in a texture pattern grid, as indicated in function box 120 of FIG. 6. Such texels surround a point on the texture pattern grid that corresponds to a pixel to be displayed.

As indicated by function boxes 122 and 125, a decision is subsequently made as to the mode of operation. Such decision is governed by the type of representation of the pixel information components that are received. It should be noted that, in one embodiment, the processor indicates the particular type of representation of the pixel information components.

If the information components of the current pixel are in a postmultiplied representation, that is, the result of operation 125 is "NO", the method is carried out wherein an additional operation 127 is performed. In particular, such operation includes multiplying, or modulating, the various information components of the pixel at hand.

If the information components of the current pixel are in a colorkeyed representation, that is, the result of operation 122 is a "YES", then one or two steps are performed. First the operation 124 is performed, checking to see if the texel matches the colorkey. Note that this matching test is applied to each texel individually. Also, this matching test can be performed in many different ways, for example, texels match the colorkey if some or all of the bits are identical, or the texel and the colorkey are sufficiently identical, based on a distance metric in RGB color space, or YUV color space. If there is no match, the operation 124 takes the "NO" branch. If there is a match, the texel (R, G, B, and α) components are changed to (0, 0, 0, and 0), as indicated by operation 126.

If, on the other hand, the information components of the current pixel are in a premultiplied representation, the method of the present invention does not multiply the information components and merely passes them for being subsequently interpolated in an operation 128.

By these features, the present invention ensures that the pixel information components are in a premultiplied representation so that they may be interpolated. This affords a "smoother" resultant image. After interpolation, a texture blend and frame blend operation are carried out, as indicated by function boxes 130 and 132, respectively. Such steps are standard processes that are well known in the computer graphics processing arts.

In further embodiments, the step of multiplying the information components of the pixel may be modified to increase precision. Prior multiplication procedures result in the loss of information. For example, the multiplication of two 8-bit numbers will result in a number in the range of 0–254, thereby losing precision. In order to overcome this difficulty and maintain optimal precision, a multiplication operation of the present invention may be carried out. The operation is expressed concisely in the C programming language as follows:

```
X'=X==0?0:α==0?0:X>α?(X*α+X)>>BITS:(X*α+α)>>BITS;
```

In the expression above, X is one of the R, G, or B components, and α is the alpha channel. X' is the resulting component value. BITS represents the number of bits that are used to represent a component, e.g., 5, 6, or 8. The implementation works with any number of bits that are in common practice.

Yet another example of executing the multiply operation on information components of a pixel with increased precision is based on the fact that a binary representation of zero to 1.0 is a fraction. For example, given a 5 bit number, 0 is represented by 00000 and 1.0 is represented by 11111 in a binary format. In other words, 1.0 is represented by 0.11111 in a fixed point representation. A problem arises if one multiplies 11111 by 11111 in that an answer of 11110.00001 results that, after the fraction bits are discarded, ends up being 11110 which is an incorrect answer.

To overcome this deficiency, a method of the present invention first includes the step of replicating a predetermined number of bits of a first information component of a pixel. Such replication is carried out on the uppermost bits to augment a size of the first information component of the pixel. A similar replication is then performed on a similar number of bits of a second information component of a pixel to augment a size of the second information component. For example, with a 1, 5 or 6 bit information component of the pixel, the uppermost 1, 2, or 3 bits are replicated to the bottom of the string of bits to render an 8 bit information component. Next, the augmented first and second information components are multiplied. Finally, lowermost bits of the first and second information components are disregarded to generate a product which is outputted to depict a portion of an image on a display. For example, in a fixed point representation, .11111111 is multiplied by .1111111 to render 11111110.00000001. When the lowermost bits are discarded, the correct answer, 11111, still remains. A C language representation of the above operation is as follows:

```
X'=(bit_replicate(X)*bit_replicate(α))>>(16-(8-SRCBITS))
```

In the expression above, SRCBITS is the number of bits in the source component, e.g., 1, 5, or 6, but can be any value from 1 to 8. Bit_replicate ( ) is the replication function described in the paragraph above.

Yet another example of executing the multiply operation on information components of a pixel with increased precision is based on implementing an accurate approximation to a divide by 255. Computation is as follows:

$$X'=\mathrm{round}(X^*\alpha/255)=\mathrm{floor}(X^*\alpha/255+0.5)$$

The value of 1/255 may be accurately expanded into an infinite series as follows:

$$1/255=1/256+1/65536+1/16777216+\ldots$$

Thereafter, the following is computed.

$$X'=\mathrm{floor}((X^*\alpha)/256+(X^*\alpha)/65536+\ldots+128/256)=\mathrm{floor}(((X^*\alpha)+(X^*\alpha)/256+128)/256)$$

The latter expression is an approximation that is correct to 8 bits. Note that the 128 term comes from 128/256=0.5. The C language representation of the above operation is as follows:

$$X'=(X^*\alpha)+((X^*\alpha)>>8)+128)>>8$$

It should be noted that the "255" term comes from assuming that the α component is represented by 8 bits; $255=2^8-1$. For components of other bit depths, a similar series expansion, possibly with additional terms, is used. For example, for a 6 bit α component, the infinite series is as follows:

$$1/63=1/64+1/4096+1/262144\ldots$$

To preserve additional accuracy, it is sometimes necessary to scale the series, e.g., compute 1/63=4/(63*4) instead. The correct C language representation of the operation where the α component is 6 bits and the X component is no more than 8 bits is as follows:

$$X'=(((X^*\alpha)<<2)+((X^*\alpha)>>4)+((X^*\alpha)>>10)+32^*4)>>8$$

It should be understood that the 32*4 term comes from (32*4)/(64*4)=0.5.

Figure 7:
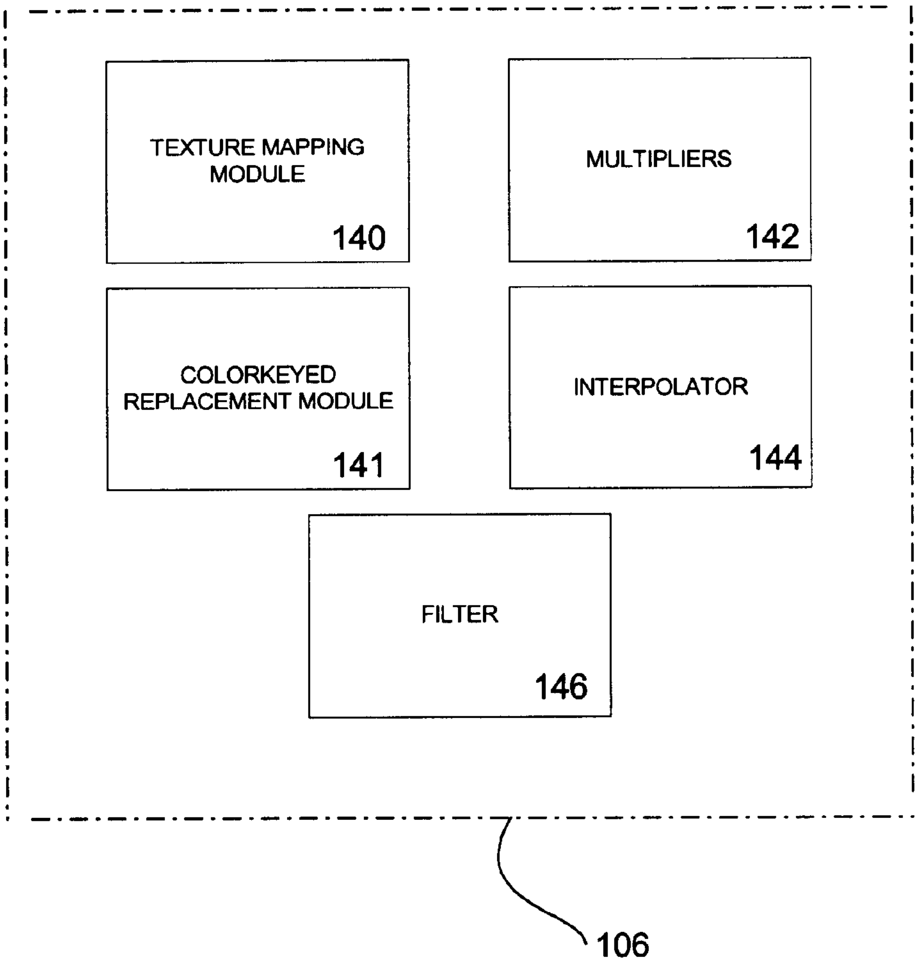
FIG. 7 is a schematic diagram of one possible hardware implementation of the present invention.

In alternate embodiments, the various steps or acts of the present invention may be carried out in different orders insofar as the overall objective is accomplished. Further, as mentioned earlier, the method, or operations, of the present invention may be implemented by either software or hardware components of a system. For example, as shown in FIG. 7, an illustrative computer graphics module 106 of the computer 100 may be provided having various components. As shown, a texture mapping module 140, a colorkeyed replacement module 141, multipliers 142, an interpolator 144, and a filter 146 are interconnected between the processor 101 and the display 108. It should be understood that the illustrative implementation shown is merely an example of a type of a graphics system capable of implementing the present invention, and that numerous other graphics system implementations can be employed.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for processing one or more pixel component representations, comprising the operations of:

identifying a plurality of texels in a texture pattern grid that correlate to a pixel;

conditionally multiplying components of the pixel if the components of the pixel are in a postmultiplied representation, and interpolating a position on the texture pattern grid between the texels that corresponds to the pixel.

2. The method as recited in claim 1, further comprising the operation of carrying out a colorkeyed replacement operation if the components of the pixel are in a colorkeyed representation and at least one of the texels substantially matches a colorkey.

3. A method for processing one or more pixel component representations, comprising the operations of:

identifying a plurality of texels in a texture pattern grid that correlate to a pixel;

multiplying components of the pixel if the components of the pixel are in a postmultiplied representation; and interpolating a position on the texture pattern grid between the texels that corresponds to the pixel;

wherein the step of multiplying the components of the pixel is carried out with increased precision by: multiplying a first component of a pixel with a second component of the pixel to generate a product, adding the product to at least one of the first component and the second component of the pixel to generate a sum, right shifting the sum, and utilizing the shifted sum to depict a portion of an image on a display.

4. A method for processing one or more pixel component representations, comprising the operations of:

identifying a plurality of texels in a texture pattern grid that correlate to a pixel;

multiplying components of the pixel if the components of the pixel are in a postmultiplied representation; and interpolating a position on the texture pattern grid between the texels that corresponds to the pixel;

wherein the step of multiplying the components of the pixel is carried out with increased precision by: replicating a predetermined number of bits of a first component of a pixel to augment a size of the first component of the pixel, replicating a predetermined number of bits of a second component of a pixel to augment a size of the second component of the pixel, multiplying the first and second components to generate a product, right shifting the product, and utilizing the shifted product to depict a portion of an image on a display.

5. A method for processing one or more pixel component representations, comprising the operations of:

identifying a plurality of texels in a texture pattern grid that correlate to a pixel;

multiplying components of the pixel if the components of the pixel are in a postmultiplied representation; and interpolating a position on the texture pattern grid between the texels that corresponds to the pixel;

wherein the step of multiplying the components of the pixel is carried out with increased precision by: multiplying a first component of a pixel with a second component of the pixel to generate a first value, multiplying the first component of the pixel with the second component of the pixel to generate a product, right shifting the product to generate a second value, adding the first value and the second value to generate a sum, right shifting the sum, and utilizing the shifted sum to depict a portion of an image on a display.

6. A method for processing one or more pixel component representations, comprising the operations of:

identifying a plurality of texels in a texture pattern grid that correlate to a pixel;

conditionally carrying out a colorkeyed replacement operation if components of the pixel are in a colorkeyed representation and at least one of the texels substantially matches a colorkey; and interpolating a position on the texture pattern grid between the texels that corresponds to the pixel.

7. A computer program embodied on a computer-readable medium that processes one or more pixel components, comprising:

a code segment that identifies a plurality of texels in a texture pattern grid that correlate with a pixel; and a code segment that conditionally multiplies a component of the pixel when the component of the pixel is in a postmultiplied representation.

8. A computer program embodied on a computer-readable medium that processes one or more pixel components as recited in claim 7, including a code segment that interpolates a position on the texture pattern grid between the texels that correlates to the pixel.

9. A computer program embodied on a computer-readable medium that processes one or more pixel components as recited in claim 7, including a code segment that performs a colorkeyed replacement operation if the components of the pixel are in a colorkeyed representation and at least one of the texels substantially matches a colorkey.

10. A computer program embodied on a computer-readable medium that processes one or more pixel components, comprising:

a code segment that identifies a plurality of textures is in a texture pattern grid that correlate with a pixel; and a code segment that multiplies a component of the pixel when the component of the pixel is in a postmultiplied representation;

wherein the code that multiplies does so with increased precision by: multiplying a first component of a pixel with a second component of the pixel to generate a product, adding the product to at least one of the first component and the second component of the pixel to generate a sum, right shifting the sum, and utilizing the shifted sum to depict a portion of an image on a display.

11. A computer program embodied on a computer-readable medium that processes one or more pixel components, comprising:

a code segment that identifies a plurality of texels in a texture pattern grid that correlate with a pixel; and a code segment that multiplies a component of the pixel when the component of the pixel is in a postmultiplied representation;

wherein the code that multiplies does so with increased precision by: replicating a predetermined number of bits of a first component of a pixel to augment a size of the first component of the pixel, replicating a predetermined number of bits of a second component of a pixel to augment a size of the second component of the pixel, multiplying the first and second components to generate a product, right shifting the product, and utilizing the shifted product to depict a portion of an image on a display.

12. A computer program embodied on a computer-readable medium that processes one or more pixel components, comprising:

a code segment that identifies a plurality of texels in a texture pattern grid that correlate with a pixel; and a code segment that multiplies a component of the pixel when the component of the pixel is in a postmultiplied representation;

wherein the code that multiplies does so with increased precision by: multiplying a first component of a pixel with a second component of the pixel to generate a first value, multiplying the first component of the pixel with the second component of the pixel to generate a product, right shifting the product to generate a second value, adding the first value and the second value to generate a sum, right shifting the sum, and utilizing the shifted sum to depict a portion of an image on a display.

13. A computer program embodied on a computer-readable medium that processes one or more pixel components, comprising:

a code segment that identifies a plurality of texels in a texture pattern grid that correlate with a pixel; and a code segment that conditionally performs a colorkeyed replacement operation if the components of the pixel are in a colorkeyed representation and at least one of the texels substantially matches a colorkey.

14. An apparatus for processing multiple types of pixel component representations, comprising:

a texel identifier for identifying a plurality of texels in a texture pattern grid that correspond to a pixel;

a multiplier for conditionally multiplying components of the pixel if the components of the pixel are in a postmultiplied representation;

an interpolator to interpolate a position on the texture pattern grid between the texels that corresponds to the pixel; and a filter for filtering the components of the pixel.

15. The apparatus as set forth in claim 14, wherein a colorkeyed replacement operation is carried out if the components of the pixel are in a colorkeyed representation and at least one of the texels substantially matches a colorkey.

16. An apparatus for processing multiple types of pixel component representations, comprising:

a texel identifier for identifying a plurality of texels in a texture pattern grid that correspond to a pixel;

a multiplier for multiplying components of the pixel if the components of the pixel are in a postmultiplied representation;

an interpolator to interpolate a position on the texture pattern grid between the texels that corresponds to the pixel; and a filter for filtering the components of the pixel;

wherein multiplier multiplies the components of the pixel with increased precision by: multiplying a first component of a pixel with a second component of the pixel to generate a product, adding the product to at least one of the first component and the second component of the pixel to generate a sum, right shifting the sum, and utilizing the shifted sum to depict a portion of an image on a display.

17. An apparatus for processing multiple types of pixel component representations, comprising:

a texel identifier for identifying a plurality of texels in a texture pattern grid that correspond to a pixel;

a multiplier for multiplying components of the pixel if the components of the pixel are in a postmultiplied representation;

an interpolator to interpolate a position on the texture pattern grid between the texels that corresponds to the pixel; and a filter for filtering the components of the pixel;

wherein multiplier multiplies the components of the pixel with increased precision by: replicating a predetermined number of bits of a first component of a pixel to augment a size of the first component of the pixel, replicating a predetermined number of bits of a second component of a pixel to augment a size of the second component of the pixel, multiplying the first and second components to generate a product, right shifting the product, and utilizing the shifted product to depict a portion of an image on a display.

18. An apparatus for processing multiple types of pixel component representations, comprising:

a texel identifier for identifying a plurality of texels in a texture pattern grid that correspond to a pixel;

a multiplier for multiplying components of the pixel if the components of the pixel are in a postmultiplied representation;

an interpolator to interpolate a position on the texture pattern grid between the texels that corresponds to the pixel; and a filter for filtering the components of the pixel;

wherein multiplier multiplies the components of the pixel with increased precision by: multiplying a first component of a pixel with a second component of the pixel to generate a first value, multiplying the first component of the pixel with the second component of the pixel to generate a product, right shifting the product to generate a second value, adding the first value and the second value to generate a sum, right shifting the sum, and utilizing the shifted sum to depict a portion of an image on a display.

19. An apparatus for processing multiple types of pixel component representations, comprising:

a texel identifier for identifying a plurality of texels in a texture pattern grid that correspond to a pixel;

a replacement module for conditionally carrying out a colorkey replacement operation if components of the pixel are in a colorkeyed representation and at least one of the texels substantially matches a colorkey;

an interpolator to interpolate a position on the texture pattern grid between the texels that corresponds to the pixel; and a filter for filtering the components of the pixel.

20. A method for executing a multiply operation on components of a pixel with increased precision, comprising:

(a) multiplying a first component of a pixel with a second component of the pixel to generate a product;

(b) adding the product to at least one of the first component and the second component of the pixel to generate a sum;

(c) right shifting the sum; and (d) utilizing the shifted sum to depict a portion of an image on a display.

21. The method as set forth in claim 20, wherein a number of bits shifted is equal to a number of bits used to represent the first and second components.

22. The method as set forth in claim 20, wherein a greatest one of the first component and the second component of the pixel is added to the first value to generate the sum.

23. A method for executing a multiply operation on components of a pixel with increased precision, comprising:

(a) replicating a predetermined number of bits of a first component of a pixel to augment a size of the first component of the pixel;

(b) replicating a predetermined number of bits of a second component of a pixel to augment a size of the second component of the pixel;

(c) multiplying the first and second components to generate a product;

(d) right shifting the product; and (e) utilizing the shifted product to depict a portion of an image on a display.

24. The method as set forth in claim 23, wherein uppermost bits of the components are replicated.

25. The method as set forth in claim 23, wherein shifting the product discards lowermost bits of the first and second components.

26. A method for executing a multiply operation on components of a pixel with increased precision, comprising:

(a) multiplying a first component of a pixel with a second component of the pixel to generate a first value;

(b) multiplying the first component of the pixel with the second component of the pixel to generate a product;

(c) right shifting the product to generate a second value;

(d) adding the first value and the second value to generate a sum;

(e) right shifting the sum; and (f) utilizing the shifted sum to depict a portion of an image on a display.

27. The method as set forth in claim 26, wherein a third value is added to the sum prior to shifting the sum, the third value including a rounding factor.

28. The method as set forth in claim 27, wherein a fourth value is added to the sum prior to shifting the sum, the fourth value being a left shifted product of the first component and the second component of the pixel.

29. The method as set forth in claim 28, wherein a fifth value is added to the sum prior to shifting the sum, the fifth value being a right shifted product of the first component and the second component of the pixel.

30. A method for processing one or more pixel component representations, comprising the operations of:

identifying a plurality of texels in a texture pattern grid that correlate to a pixel;

determining whether components of the pixel are in a postmultiplied representation;

if the components of the pixel are in the postmultiplied representation, multiplying the components of the pixel; and interpolating a position on the texture pattern grid between the texels that corresponds to the pixel.

31. A method for processing one or more pixel component representations, comprising the operations of:

identifying a plurality of texels in a texture pattern grid that correlate to a pixel;

determining whether components of the pixel are in a colorkeyed representation and at least one of the texels substantially matches a colorkey;

if the components of the pixel are in the colorkeyed representation and at least one of the texels substantially matches the colorkey, carrying out a colorkeyed replacement operation; and interpolating a position on the texture pattern grid between the texels that corresponds to the pixel.

* * * * *

UNITED STATES PATENT AND TRADEMARK OFFICE

CERTIFICATE OF CORRECTION

PATENT NO. : 6,577,320 B1

APPLICATION NO. : 09/273995

DATED : June 10, 2003

INVENTOR(S) : Kirk

It is certified that error appears in the above-identified patent and that said Letters Patent is hereby corrected as shown below:

In the claims:

col. 7, line 65 replace “representation,” with --representation;--;

col. 9, line 25 replace “textures” with --texels--.

Signed and Sealed this

Sixteenth Day of February, 2010

David J. Kappos

*Director of the United States Patent and Trademark Office*